United States Patent
Campau et al.

(10) Patent No.: US 6,860,569 B1
(45) Date of Patent: Mar. 1, 2005

(54) ELECTRO-HYDRAULIC BRAKE SYSTEM WITH FOUR WHEEL PUSH THROUGH

(75) Inventors: Gregory P. Campau, Plymouth, MI (US); Edward Nelson Fuller, Manchester, MI (US)

(73) Assignee: Kelsey-Hayes Company, Livonia, MI (US)

(*) Notice: Subject to any disclaimer, the term of this patent is extended or adjusted under 35 U.S.C. 154(b) by 0 days.

(21) Appl. No.: 10/444,885

(22) Filed: May 23, 2003

Related U.S. Application Data
(60) Provisional application No. 60/382,746, filed on May 23, 2002.

(51) Int. Cl.[7] ............................................ B60T 12/18
(52) U.S. Cl. .................... 303/11; 303/115.4; 303/116.2; 303/114.1
(58) Field of Search .................. 303/3, 10, 11, 303/114.1, 115.4, 116.2, DIG. 11, 113.3, 115.1, 115.2, 113.4

(56) References Cited

U.S. PATENT DOCUMENTS
| | | |
|---|---|---|
| 3,802,745 A | 4/1974 | Strifler et al. |
| 4,462,642 A | 7/1984 | Leiber |

(List continued on next page.)

FOREIGN PATENT DOCUMENTS
| | | |
|---|---|---|
| DE | 1961039 | 6/1971 |
| DE | 3408872 | 9/1985 |
| DE | 3423944 | 1/1986 |
| DE | 4029793 | 3/1992 |
| DE | 4037662 | 6/1992 |
| DE | 4112137 | 10/1992 |
| DE | 4128087 | 2/1993 |
| DE | 4201732 | 7/1993 |
| DE | 4231784 | 3/1994 |
| DE | 4311673 | 10/1994 |
| DE | 4319509 | 12/1994 |
| DE | 4322182 | 1/1995 |

(List continued on next page.)

OTHER PUBLICATIONS

"Electrohydraulic Brake System—The First Approach to Brake–By–Wire Technology" by Jonner et al., SAE Technical Paper Series #960991, copyright 1996 Society of Automotive Engineers, Inc.

"Intelligent Braking for Current and Future Vehicles" by Schenk et al., SAE Technical Series #950762, copyright 1995 Society of Automotive Engineers, Inc.

Abstract of patent document DE3423944 printed from the EPO internet site http://12.espacenet.com/espacenet/viewer?PN=DE3423944&CY=ep&LG=en&DB=EPD, printed Jul. 25, 2002.

Abstract of patent document DE4037662 printed from the EPO internet site http://12.espacenet.com/espacenet/viewer?PN=DE4037662&CY=ep&LG=en&DB=EPD, printed Jul. 25, 2002.

*Primary Examiner*—Robert A. Siconolfi
*Assistant Examiner*—Melanie Torres
(74) *Attorney, Agent, or Firm*—MacMillan, Sobanski & Todd, LLC

(57) ABSTRACT

An improved electro-hydraulic brake system having an electrically powered normal source of pressurized hydraulic brake fluid, and a manually powered backup source of pressurized hydraulic brake fluid to all four of the vehicle brakes in the event of failure of the normal source. During normal braking, fluid from the backup source is redirected from the vehicle brakes to a pedal simulator. The brake system of the invention further diverse arrangements for providing braking in the event of a failure of the normal source of pressurized fluid. The brake circuit for the front wheels are provided with relatively low cost fluid separator units, while the rear brake circuit is not.

20 Claims, 1 Drawing Sheet

U.S. PATENT DOCUMENTS

| | | | |
|---|---|---|---|
| 4,580,847 A | | 4/1986 | Burgdorf |
| 4,640,555 A | | 2/1987 | Bertling et al. |
| 4,656,833 A | | 4/1987 | Belart |
| 4,723,412 A | | 2/1988 | Buschmann |
| 4,812,777 A | | 3/1989 | Shirai |
| 4,824,188 A | | 4/1989 | Hatch |
| 4,832,416 A | * | 5/1989 | Kaes et al. ............... 303/113.3 |
| 4,834,465 A | | 5/1989 | Guichard et al. |
| 4,880,282 A | | 11/1989 | Makino et al. |
| 4,914,917 A | | 4/1990 | Schonlau |
| 4,950,038 A | | 8/1990 | Ocvirk et al. |
| 5,123,713 A | | 6/1992 | Steiner |
| 5,195,810 A | | 3/1993 | Ocvirk et al. |
| 5,197,787 A | | 3/1993 | Matsuda et al. |
| 5,230,549 A | | 7/1993 | Osada et al. |
| 5,261,730 A | | 11/1993 | Steiner et al. |
| 5,282,676 A | | 2/1994 | Takeda et al. |
| 5,288,139 A | | 2/1994 | Singleton et al. |
| 5,302,008 A | | 4/1994 | Miyake et al. |
| 5,312,172 A | | 5/1994 | Takeuchi |
| 5,320,421 A | | 6/1994 | Kade et al. |
| 5,360,322 A | | 11/1994 | Henein et al. |
| 5,378,052 A | | 1/1995 | Yoshino |
| 5,429,425 A | | 7/1995 | Drott |
| 5,447,363 A | | 9/1995 | Fukamachi |
| 5,460,436 A | | 10/1995 | Volz et al. |
| 5,475,596 A | | 12/1995 | Henry et al. |
| 5,484,194 A | | 1/1996 | Reinartz et al. |
| 5,496,099 A | | 3/1996 | Resch |
| 5,531,509 A | | 7/1996 | Kellner et al. |
| 5,544,948 A | | 8/1996 | Schmidt et al. |
| 5,547,264 A | | 8/1996 | Tozu et al. |
| 5,558,409 A | | 9/1996 | Walenty et al. |
| 5,567,021 A | | 10/1996 | Gaillard |
| 5,588,718 A | | 12/1996 | Winner et al. |
| 5,609,401 A | | 3/1997 | Johnston et al. |
| 5,613,740 A | | 3/1997 | Kawamoto et al. |
| 5,700,072 A | | 12/1997 | Cook et al. |
| 5,720,534 A | | 2/1998 | Stumpe |
| 5,722,744 A | | 3/1998 | Kupfer et al. |
| 5,727,852 A | | 3/1998 | Pueschel et al. |
| 5,743,600 A | | 4/1998 | Yasuda et al. |
| 5,752,748 A | | 5/1998 | Schramm et al. |
| 5,788,341 A | | 8/1998 | Penrod et al. |
| 5,816,666 A | | 10/1998 | Wiss |
| 5,823,640 A | | 10/1998 | Eichhorn et al. |
| 5,908,983 A | | 6/1999 | Binder |
| 5,918,948 A | | 7/1999 | Burgdorf et al. |
| 5,934,767 A | | 8/1999 | Schmidt et al. |
| 5,941,608 A | | 8/1999 | Campau et al. |
| 5,941,924 A | | 8/1999 | Maisch |
| 5,952,799 A | | 9/1999 | Maisch et al. |
| 5,954,407 A | | 9/1999 | Schramm et al. |
| 5,979,999 A | | 11/1999 | Poertzgen et al. |
| 5,988,768 A | | 11/1999 | Schaefer et al. |
| 6,003,961 A | | 12/1999 | Binder et al. |
| 6,007,161 A | | 12/1999 | Wörsdörfer |
| 6,019,441 A | | 2/2000 | Lloyd et al. |
| 6,030,055 A | | 2/2000 | Schubert |
| 6,033,035 A | | 3/2000 | Neumann et al. |
| 6,033,036 A | | 3/2000 | Rüffer et al. |
| 6,058,705 A | | 5/2000 | Schunck |
| 6,074,019 A | | 6/2000 | Phillips et al. |
| 6,076,897 A | | 6/2000 | Binder et al. |
| 6,082,830 A | | 7/2000 | Volz et al. |
| 6,086,167 A | | 7/2000 | Heckmann et al. |
| 6,135,575 A | | 10/2000 | Feigel et al. |
| 6,149,247 A | | 11/2000 | Hofmann et al. |
| 6,158,825 A | | 12/2000 | Schunck et al. |
| 6,161,904 A | | 12/2000 | Schmidt et al. |
| 6,164,336 A | | 12/2000 | Pasquet et al. |
| 6,186,602 B1 | | 2/2001 | Jonner et al. |
| 6,192,685 B1 | | 2/2001 | Bourlon et al. |
| 6,206,484 B1 | * | 3/2001 | Ganzel .................... 303/113.4 |
| 6,206,488 B1 | | 3/2001 | Binder et al. |
| 6,206,489 B1 | | 3/2001 | Schmidt et al. |

FOREIGN PATENT DOCUMENTS

| | | |
|---|---|---|
| DE | 4324041 | 1/1995 |
| DE | 4413579 | 10/1995 |
| DE | 4417667 | 11/1995 |
| DE | 19538794 | 4/1997 |
| DE | 19548207 | 6/1997 |
| DE | 19548248 | 6/1997 |
| DE | 19604126 | 8/1997 |
| DE | 19615449 | 10/1997 |
| DE | 19626926 | 1/1998 |
| DE | 19632035 | 2/1998 |
| DE | 19636432 | 3/1998 |
| DE | 19640781 | 4/1998 |
| DE | 19701659 | 7/1998 |
| DE | 19812793 | 10/1998 |
| DE | 19718533 | 11/1998 |
| DE | 19725298 | 12/1998 |
| DE | 19734986 | 2/1999 |
| DE | 19807368 | 8/1999 |
| DE | 19821793 | 11/1999 |
| DE | 19825464 | 12/1999 |
| DE | 19826132 | 12/1999 |
| DE | 19826687 | 12/1999 |
| DE | 19915752 | 1/2000 |
| DE | 19828552 | 2/2000 |
| DE | 19828553 | 2/2000 |
| DE | 19836689 | 2/2000 |
| DE | 19836690 | 2/2000 |
| DE | 19836692 | 2/2000 |
| DE | 19831541 | 3/2000 |
| DE | 19838948 | 3/2000 |
| DE | 19850910 | 5/2000 |
| DE | 19861144 | 5/2000 |
| DE | 19905660 | 5/2000 |
| DE | 19920850 | 5/2000 |
| DE | 19933517 | 5/2000 |
| DE | 19940252 | 6/2000 |
| DE | 19914403 | 10/2000 |
| DE | 19917941 | 10/2000 |
| DE | 19917904 | 11/2000 |
| EP | 0348270 | 12/1989 |
| FR | 2655933 | 6/1991 |
| GB | 2327105 | 1/1999 |
| GB | 2340194 | 2/2000 |
| WO | WO 93/00236 | 1/1993 |
| WO | WO 93/08055 | 4/1993 |
| WO | WO 96/11129 | 4/1996 |
| WO | WO 96/39318 A1 | 12/1996 |
| WO | WO 97/32766 | 9/1997 |

* cited by examiner

ELECTRO-HYDRAULIC BRAKE SYSTEM WITH FOUR WHEEL PUSH THROUGH

This application claims the benefit of Provisional Application No. 60/382,746, filed May 23, 2002.

This invention relates in general to brake systems for ground vehicles, and in particular to electro-hydraulic brake systems with normal braking pressure supplied by an electrically driven pump.

Electro-hydraulic braking systems with manually powered backup systems have been shown in some publications. For example, German Patent Application DE 4413579A1 (the disclosure of which is incorporated herein by reference) illustrates a system having a manually powered master cylinder connected through isolation valves to brakes at a vehicle's wheels. When the isolation valves are shut, pressurized brake fluid from the master cylinder is delivered to a pedal simulator. Pressure transducers are used to develop a signal representative of a desired braking effort, which is fed to an electronic control unit. The electronic control unit controls the operation of motor operated braking pressure generators (pumps) to correspondingly deliver pressurized hydraulic brake fluid to the vehicle brakes.

SUMMARY OF THE INVENTION

This invention relates to a brake system for a vehicle having a normal source of pressurized hydraulic brake fluid, such as a electric motor-driven pump, and a backup source of pressurized hydraulic brake fluid, such as a manually operated brake pedal unit (including a master cylinder). The vehicle is provided with a front vehicle brake that is operated by application of pressurized hydraulic brake fluid thereto. A front fluid conduit connects the front vehicle brake with the backup source. A front isolation valve is disposed in the front fluid conduit for selectively preventing the flow of hydraulic brake fluid between the backup source and the front vehicle brake. A fluid separator unit prevents intermixing of the hydraulic brake fluid of the normal source and the hydraulic brake fluid of the backup source. The fluid separator unit has a movable pressure boundary which enables, through movement thereof, the normal source of pressurized hydraulic brake fluid to selectively act upon the vehicle brake via a portion of the front fluid conduit when the front isolation valve is shut. A front valve arrangement is also provided for selectively supplying pressurized fluid from the normal source to the fluid separator unit and for selectively venting fluid from the fluid separator unit to selectively move the movable pressure boundary.

The vehicle is also provided with a rear vehicle brake that is operated by application of pressurized hydraulic brake fluid thereto. A rear fluid conduit connects the rear vehicle brake with the backup source. A rear isolation valve is disposed in the rear fluid conduit for selectively preventing the flow of hydraulic brake fluid between the backup source and the rear vehicle brake. A rear valve arrangement is also provided for selectively supplying pressurized fluid from the normal source to the rear vehicle brake and for selectively venting fluid from the rear vehicle brake.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
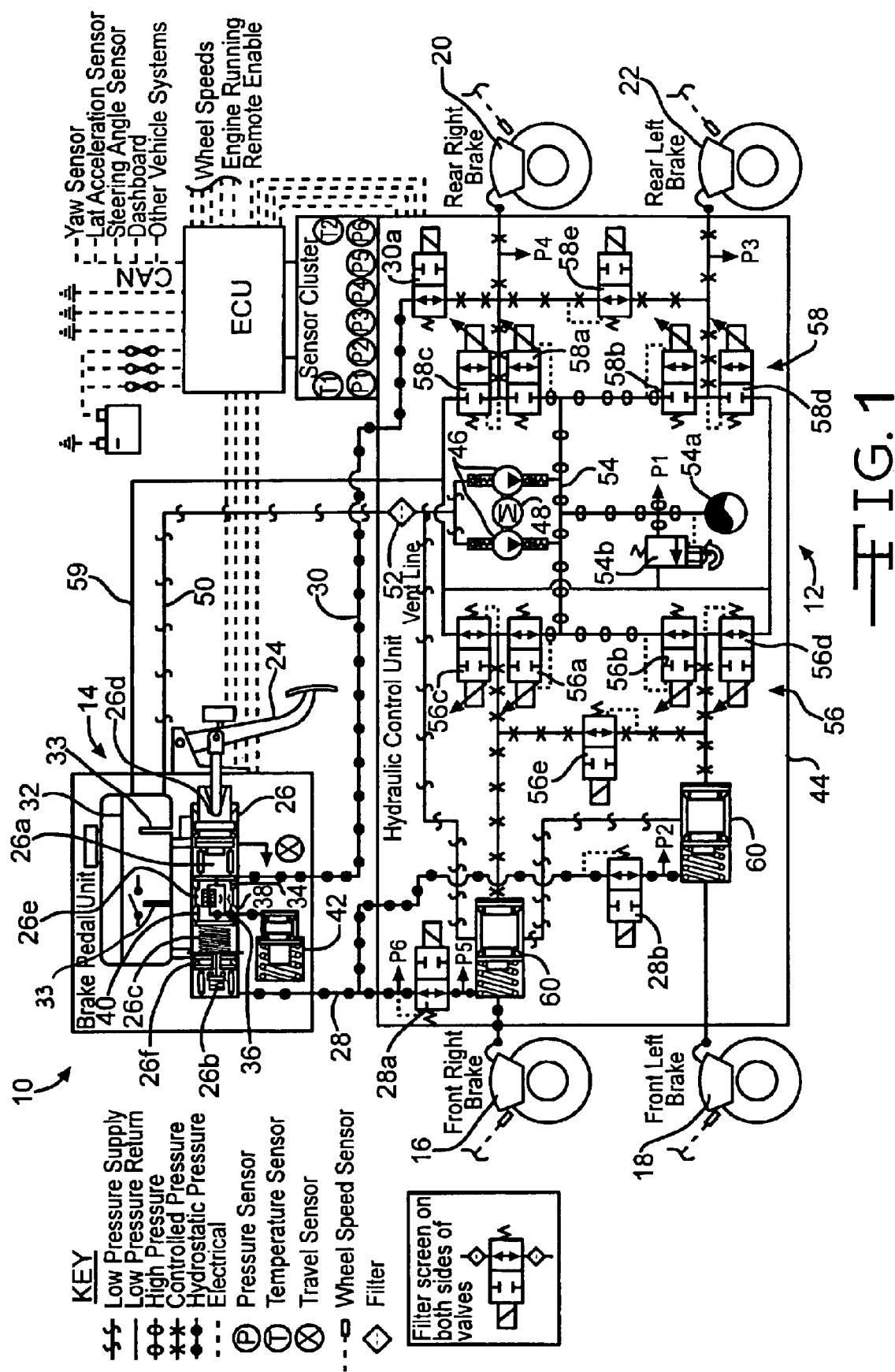
FIG. 1 is a schematic view of an embodiment of a vehicle brake system according to the invention.

Preliminarily, it should be noted that as used in this application, the term "normally open" when used to describe a valve describes the operation of the valve with respect to the energized/deenergized state of the valve, and does not implicate the valve's position during normal or abnormal braking operations. A normally open valve is one which is open when electrically deenergized. In a similar vein, a normally closed valve is one which is closed when the valve is electrically deenergized.

Referring now to the drawings, there is illustrated in FIG. 1 a brake system for a vehicle, indicated generally at 10. The brake system 10 includes a normal source of pressurized hydraulic brake fluid, indicated generally at 12, and a backup source of pressurized hydraulic brake fluid, indicated generally at 14. The vehicle is provided with a plurality of wheels; in the illustrated embodiment, the brake system 10 includes front brakes for a pair of front wheels, namely the front right brake 16, and the front left brake 18, and rear brakes for a pair of rear wheels, namely the rear right brake 20 and the rear left brake 22.

The backup source 14 may be embodied as any suitable source of pressurized hydraulic fluid, including electrically driven pumps with sources of electrical power separate from that supplying the normal source 12, or supplied with pneumatic or mechanical reservoirs of energy, and so forth. However in the preferred embodiment illustrated in FIG. 1, the backup source 14 is embodied as a brake pedal unit and is powered by the operator of the vehicle through a brake pedal 24 to drive a master cylinder 26. The master cylinder 26 includes a primary chamber 26a which provides pressurized brake fluid for the rear brakes 20, 22, and a secondary chamber 26b, which provides pressurized brake fluid for the front brakes 16, 18. A front fluid conduit 28 connects the front vehicle brakes 16, 18 with the secondary chamber 26b. Similarly, a rear fluid conduit 30 connects the rear vehicle brakes 20, 22 with the primary chamber 26a. The master cylinder 26 also includes an intermediate chamber 26c. The primary chamber 26a is defined between a primary piston 26d and an intermediate piston 26e disposed in the master cylinder 26. The intermediate chamber 26c is defined between the intermediate piston 26e and a secondary piston 26f disposed in the master cylinder 26. The primary chamber 26a and secondary chamber 26b of the master cylinder 26 are conventionally connected to a fluid reservoir 32, when the primary piston 26d and secondary piston 26f, are in their respective rest (unactuated) positions. The fluid reservoir 32 has a pair of baffles 33 extending along the bottom of the reservoir 32 to divide the volume of the reservoir 32, below the level of the tops of the baffles, into three separate volumes: one for each of the primary and secondary chambers 26a, 26b, and one connected to the normal source 12 as will be described below. The baffles 33 can have any suitable dimensions to divide the reservoir 32 into separate volumes.

The intermediate piston 26e is sealed to the walls of the master cylinder by dynamic seals 34, 36, and 38 at respective axial locations along the piston 26e. Dynamic seals move with the piston on which they are mounted. An annular space 40 is defined about the intermediate piston 26e between the seals 36 and 38. When the intermediate piston 26e is in its rest position (i.e., the position that the intermediate piston 26e is in when the brake pedal 24 is not depressed) the annular space 40 is axially aligned with an opening in the master cylinder 26, through which the annular space can communicate with a pedal simulator 42. The annular space 40 is also continuously (regardless of the axial position of the intermediate piston 26e) in fluid communication with the primary chamber 26a through one or more fluid passages in the intermediate piston 26e, which fluid passages may be provided with orifices and check valves to cause the resistance to fluid flow through the intermediate piston 26e to be different in one direction than the other. If fluid flow out of the secondary chamber 26b is prevented, in a manner which will be discussed below, the volume of hydraulic fluid in the intermediate chamber 26c prevents movement of the intermediate piston 26e when the brake pedal 24 is depressed, thus increasing pressure in the primary chamber 26a forces fluid through the passages in the intermediate piston 26e into the pedal simulator 42.

The pedal simulator 42 may be any suitable type of pedal simulator. In the illustrated embodiment, the pedal simulator 42 is a spring loaded piston, which gives progressively increasing resistance to piston movement, and accepts fluid displaced from the primary chamber 26a of the master cylinder 26, thereby giving a suitable feel to the brake pedal 24 during operation when flow of fluid out of the master cylinder through the front fluid conduit 28 and the rear fluid conduit 30 is prevented, as will be discussed below. Generally, the use of pedal simulators for pedal feel in brake-by-wire and other electro-hydraulic braking systems is known (taught by, for example, U.S. Pat. No. 5,941,608 to Campau et al., the disclosure of which is hereby incorporated by reference) and will not be discussed in further detail.

The front fluid conduit 28 extends from the secondary chamber 26b to the front right brake 16. A normally open right front isolation valve 28a is disposed in the front fluid conduit 28 for selectively preventing the flow of hydraulic brake fluid between the backup source 14 (more specifically, the secondary chamber 26b) and the front right vehicle brake 16. A branch of the front fluid conduit 28 connects die front left brake 18 to the secondary chamber 26b regardless of the position of the front right isolation valve 28a. A normally open left front isolation valve 28b is disposed in this branch of the front fluid conduit 28 for selectively preventing the flow of hydraulic brake fluid between the secondary chamber 26b and the front left vehicle brake 16.

Similarly, the rear fluid conduit 30 extends from the primary chamber 26a to the rear right brake 20 (and via a cross-tie valve 58e described below, to the rear left brake 22). A normally open rear isolation valve 30a is disposed in the rear fluid conduit 30 for selectively preventing the flow of hydraulic brake fluid between the backup source 14 (more specifically, the primary chamber 26a) and the rear vehicle brakes 20, 22.

When the front right isolation valve 28a or the front left isolation valve 28b is deenergized (and thus open), flow is permitted out of the secondary chamber 26b through the front fluid conduit 28 when the brake pedal 24 is depressed. When the pedal 24 is depressed, the intermediate piston will be displaced from the rest position, and the communication between the annular space 40 and the pedal simulator 42 will be prevented by movement of the seal 38 past the opening in the master cylinder connected to the pedal simulator 42. The seal 34 prevents fluid communication through the annular space surrounding the intermediate piston 26e between the opening connected to the pedal simulator 42 and the primary chamber 26a in all operating positions of the intermediate piston 26e.

The normal source 12 is preferably partially or completely contained within a hydraulic control unit (HCU) 44. The normal source 12 is preferably embodied as a positive displacement pump 46 driven by an electric motor 48. The normal source 12 can be embodied in a number of ways, some of which are illustrated and described in the previously mentioned U.S. Pat. No. 5,941,608 to Campau et al. However, in the illustrated embodiment of FIG. 1, a slightly different arrangement is presented. The pump 46 draws fluid from the fluid reservoir 32 (from the third volume below the baffles described above) through a low pressure supply line 50. A filter 52 is disposed in the low pressure supply line 50 at the inlet of the pump 46. The pump 46 discharges into a high pressure supply line 54. A high pressure accumulator 54a and a pressure relief valve 54b are connected via the high pressure supply line 54 to the discharge of the pump 46. The high pressure supply line 54 is connected to the front fluid conduit 28 via a front valve arrangement, indicated generally at 56, and to the rear fluid conduit 30 via a rear valve arrangement, indicated generally at 58.

The front valve arrangement 56 consists, in the illustrated embodiment, of a normally closed front right apply valve 56a, a normally closed front left apply valve 56b, a normally open front right release valve 56c, a normally open front left release valve 56d, and a normally open front cross-tie valve 56e. However, the front valve arrangement could include any suitable arrangement of valves for controlling the flow of fluid to the front brakes 16, 18. Other specific valve arrangements which could be made include the substitution of a three-way valve for a pair of apply and release valves, such as was done in U.S. Pat. No. 5,941,608 to Campau et al.

More specifically, the high pressure supply line 54 selectively connects the discharge of the pump 46, via the front right apply valve 56a, to the front fluid conduit 28 between the front right brake 16 and the front right isolation valve 28a in order to raise the front right brake pressure 16. The high pressure supply line 54 also selectively connects the discharge of the pump 46, via the front left apply valve 56b, to the front fluid conduit 28 between the front left brake 18 and the front left isolation valve 28b in order to raise the front left brake pressure 16. Actually, the normally open cross-tie valve 56e will normally be kept open during normal braking, and only one of the apply valves 56a and 56b will be opened, thus ensuring relatively even braking pressures on the two front brakes. Of course, the front release valves 56c, 56d are energized closed when the associated front apply valve 56a, 56b is energized to open, thus directing the high pressure brake fluid to the brake rather than back to the fluid reservoir 32. The front release valves 56c, 56d are connected to the fluid reservoir 32 via a low pressure return line 59.

Of course, if individual control of the front brake pressures is desired, such as during a Vehicle Stability Control event, the front cross-tie valve 56e can be closed, and the front apply valves 56a and 56b operated as necessary to achieve desired individual brake pressures at the front brakes 16, 18. Pressure at the front right brake 16 can be reduced by opening the front right release valve 56c (actually, if the front cross-tie valve 56e is open, pressure will be reduced at both front brakes 16, 18). In a similar manner, pressure at the front left brake 18 (or both front brakes 16, 18 if the front cross-tie valve 56e is open) can be reduced by opening the front left release valve 56d.

A fluid separator unit 60 is provided between each of the right and the left apply/release valve pairs (56a, 56c/56b, 56d) to prevent intermixing of the hydraulic brake fluid of the normal source 12 and the hydraulic brake fluid of the backup source 14. The fluid separator units 60 have a movable pressure boundary which enables, through movement thereof, the normal source of pressurized hydraulic brake fluid 12 to selectively act upon the associated vehicle front brake via a portion of the front fluid conduit 28 when associated front isolation valve 28a, 28b is shut. The fluid separator unit 60 prevents any gas bubbles which might be released into the high pressure supply line 54 in the event of a failure of the accumulator 54a (which is preferably embodied as a gas-charged volume with a moveable membrane boundary) from entering the front fluid conduit, and adversely affecting the ability of the backup source 14 to adequately apply pressure to the front brakes 16, 18. It should be also noted that during operation of the normal source 12 to supply pressure to the front brakes 16, 18, the associated isolation valve 28a, 28b should be shut to prevent fluid displaced from the piston of a fluid separator unit 60 from being sent to the master cylinder 26 instead of being directed to the associated front brake 16, 18.

The rear valve arrangement 58 is similar to the front valve arrangement 56, with certain notable exceptions. First, the rear valve arrangement does not have any fluid separators. Applicants have found that for various reasons, such as the normal weight transfer during braking of forward vehicle movement, the rear of the vehicle normally will be more lightly laden than the front of the vehicle, and thus the rear brakes 20, 22 will start to lose traction during braking at a lower brake pressure than the front brakes 16, 18. Accordingly, if some gas bubbles were to migrate from the high pressure supply line 54 to the rear fluid conduit 30, the backup source 14 could still achieve the desired braking pressure at the rear brakes 20, 22.

Because there are no fluid separators, the rear valve arrangement 58 has release valves with different normal positions than the front valve arrangement 56. More specifically, the rear valve arrangement 58 includes a normally closed rear right apply valve 58a, a normally closed rear left apply valve 58b, a normally closed rear right release valve 58c, a normally closed rear left release valve 58d, and a normally open rear cross-tie valve 58e. As with the front valve arrangement 56, the rear valve arrangement 58 could include any suitable arrangement of valves for controlling the flow of fluid to the rear brakes 20, 22. Other specific valve arrangements which could be made include the substitution of a three-way valve for a pair of apply and release valves, such as was done in U.S. Pat. No. 5,941,608 to Campau et al.

The rear vehicle brakes 20, 22 are normally operated by application of pressurized hydraulic brake fluid thereto from the normal source 12 via the high pressure line 54 and the rear valve arrangement 58, and selectively releasing pressure from the rear vehicle brakes 20, 22 via the release valves 58c, 58d, which are connected via the low pressure return line 59 to the fluid reservoir 32.

The rear fluid conduit 30 connects the rear vehicle brakes 20, 22 with the backup source 14. The rear isolation valve 30a is disposed in the rear fluid conduit 30 for selectively preventing the flow of hydraulic brake fluid between the backup source 14 and the rear vehicle brakes 20,22.

Since all of the rear apply valves 58a, 58b and the rear release valves 58c, 58d are normally closed, in the event of a loss of electrical power to drive the motor 48, the rear apply valves 58a, 58b and the rear release valves 58c, 58d will be closed, and the normally open cross-tie valve 58e and the normally open rear isolation valve 30a will be open, allowing pressurized fluid to be sent from the backup source 14 (specifically the primary chamber 26a of the master cylinder 26) to the right rear brake 20 and, via the rear cross-tie valve 58e, to the rear left brake 22.

In closing, it should be noted that all the valves described herein preferably are provided with filter screens on both sides of the valve (inlet and outlet). Also, the operation of the various electrically operated valves, and pump motor 48, is preferably under the control of an Electrical Control Unit (ECU) 62, which may be embodied in any suitable type of electronic component or components. Preferably the ECU 62 receives a wide variety of appropriate inputs including, but not limited to, various system pressures and temperatures, position indications from the brake pedal 24, yaw rate and acceleration sensors, steering angle, and wheel speeds.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A brake system comprising:
   a normal source of pressurized hydraulic brake fluid;
   a backup source of pressurized hydraulic brake fluid;
   a front vehicle brake which is operated by application of pressurized hydraulic brake fluid thereto;
   a front fluid conduit connecting said front vehicle brake with said backup source;
   a front isolation valve disposed in said front fluid conduit for selectively preventing the flow of hydraulic brake fluid between said backup source and said front vehicle brake; and
   a fluid separator unit preventing intermixing of the hydraulic brake fluid of said normal source and the hydraulic brake fluid of said backup source and having a movable pressure boundary which enables, through movement thereof, said normal source of pressurized hydraulic brake fluid to selectively act upon said vehicle brake via a portion of said front fluid conduit when said front isolation valve is shut;
   a front valve arrangement for selectively supplying pressurized fluid from said normal source to said fluid separator unit and for selectively venting fluid from said fluid separator unit to selectively move said movable pressure boundary;
   a rear vehicle brake which is operated by application of pressurized hydraulic brake fluid thereto;
   a rear fluid conduit connecting said rear vehicle brake with said backup source;
   rear isolation valve disposed in said rear fluid conduit for selectively preventing the flow of hydraulic brake fluid between said backup source and said rear vehicle brake; and
   a rear valve arrangement for selectively supplying pressurized fluid from said normal source to said rear vehicle brake and for selectively venting fluid from said rear vehicle brake.

2. The brake system defined in claim 1 wherein the backup source further comprises a master cylinder, said cylinder having a primary chamber, an intermediate chamber and a secondary chamber, each of the chambers being connected to a fluid reservoir.

3. The brake system defined in claim 2 wherein the front fluid conduit further connects the front vehicle brake to the secondary chamber, and
   the rear fluid conduit further connects the rear vehicle brake to the primary chamber.

4. The brake system defined in claim 3 wherein the primary chamber is defined between a primary piston and an intermediate piston disposed in the master cylinder.

5. The brake system defined in claim 3 wherein the intermediate chamber is defined between the intermediate piston and the secondary piston.

6. The brake system defined in claim 2 wherein said reservoir comprises a pair of baffles for dividing the reservoir into three separate volumes, one of each of said volumes being connected to the primary chamber, the secondary chamber, and the normal source of pressurized hydraulic fluid.

7. The brake system defined in claim 6 wherein at least one of said chambers is further in communication with a pedal simulator.

8. The brake system defined in claim 1 wherein the front fluid conduit extends from the secondary chamber to at least one of the front right brake and front left brake.

9. The brake system defined in claim 8 wherein the front isolation valve is disposed in said front fluid conduit for selectively preventing the flow of hydraulic brake fluid between the backup source and the front right vehicle brake; and a second front isolation valve is disposed in a branch of the front fluid conduit for selectively preventing the flow of hydraulic brake fluid between the backup source and the front left vehicle brake.

10. The brake system defined in claim 1 wherein the rear fluid conduit extends from the primary chamber to at least one of the rear right brake and rear left brake.

11. The brake system defined in claim 1 further comprising a high pressure source of fluid;

wherein said high pressure fluid source is connected to the front fluid conduit between the front right brake and front right isolation valve for raising front right brake pressure; and said high pressure fluid source is connected to the front fluid conduit between the front left brake and front left isolation valve for raising front left brake pressure.

12. The brake system defined in claim 1 wherein said front valve arrangement further comprises a normally open front cross-tie valve, said cross-tie valve positioned between the normal source and the separator unit.

13. The brake system defined in claim 12 further comprising a front right separator unit and a front left separator unit, said cross-tie valve being positioned between the normal source and the front right and front left separator units.

14. The brake system defined in claim 13 wherein said cross-tie valve is movable between an open position and a closed position to allow different brake pressures to be applied to each of the front right wheel brake and front left wheel brake.

15. The brake system defined in claim 1 wherein said rear valve arrangement further comprises a normally open rear cross-tie valve, said cross-tie valve positioned between the normal source and the rear wheel brakes.

16. The brake system defined in claim 15 wherein said cross-tie valve is movable between an open position and a closed position to allow a different brake pressures to be applied to each of the rear right wheel brake and rear left wheel brake.

17. The brake system defined in claim 1 wherein the front valve arrangement comprises at least one of a first valve arrangement including at least one normally closed apply valve and one normally open release valve, and a second valve arrangement including a three-way valve.

18. The brake system defined in claim 17 wherein the front valve arrangement further comprises a normally open cross-tie valve.

19. The brake system defined in claim 1 wherein the rear valve arrangement comprises at least one of a first valve arrangement including at least one normally closed apply valve and one normally closed release valve, and a second valve arrangement including a three-way valve.

20. The brake system defined in claim 19 wherein the rear valve arrangement further comprises a normally open cross-tie valve.

\* \* \* \* \*